United States Patent [19]
Gaudel

[11] 4,321,950
[45] Mar. 30, 1982

[54] SPHEROIDAL GRAPHITE CAST IRON PIPE AND THE PROCESS FOR PRODUCING SAME

[75] Inventor: Gerard G. Gaudel, Pont-A-Mousson, France

[73] Assignee: Pont-A-Mousson S.A., Nancy, France

[21] Appl. No.: 126,756

[22] Filed: Mar. 3, 1980

[30] Foreign Application Priority Data

Mar. 2, 1979 [FR] France .................................. 79 05447

[51] Int. Cl.³ ............................................... F16L 9/00
[52] U.S. Cl. ..................................... 138/109; 138/173
[58] Field of Search .................... 138/109, 173; 72/59, 72/342, 62

[56] References Cited

U.S. PATENT DOCUMENTS

| | | | |
|---|---|---|---|
| 1,049,542 | 1/1913 | Smith | 138/109 |
| 1,544,057 | 6/1925 | Dimick | 138/173 |
| 2,012,766 | 8/1935 | Meyer | 72/342 |
| 3,520,163 | 7/1970 | Otoda | 72/59 |
| 3,578,777 | 5/1971 | De Gain | 138/173 |
| 4,261,671 | 4/1981 | Langer | 138/173 |

*Primary Examiner*—Willis Little
*Attorney, Agent, or Firm*—Sughrue, Mion, Zinn, Macpeak and Seas

[57] ABSTRACT

The pipe has on its cylindrical wall (2) at least one corrugated circular projection (9) having the same thickness (e) as this wall. This circular projection has meridian section in the shape of an isosceles triangle having an obtuse apex angle (x) and a radiused apex (10). This triangle is connected to the cylindrical wall by wide portions (11) having a radius (R) which exceeds the radius (r) of the apex (10) and is a plurality of times greater than the thickness (e) of the wall (2).

7 Claims, 8 Drawing Figures

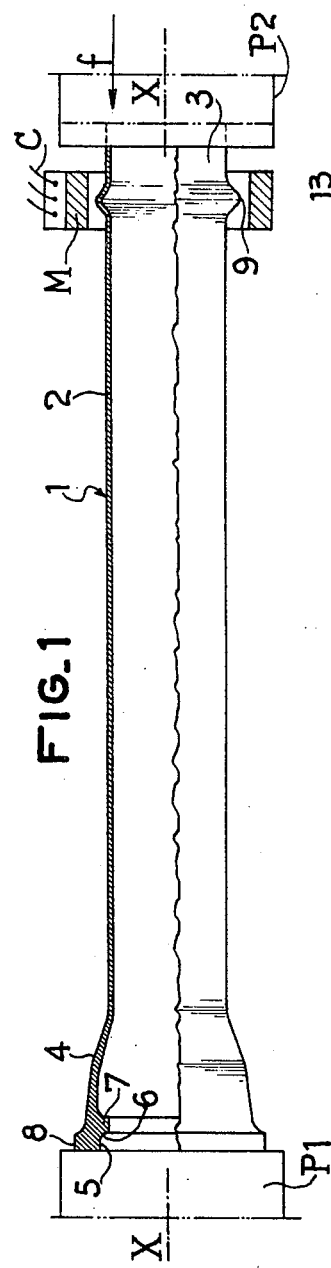
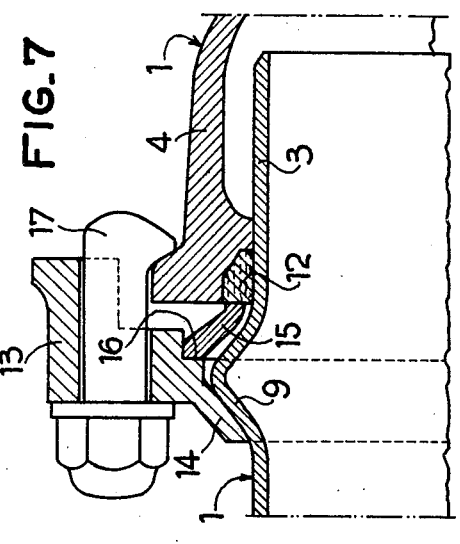
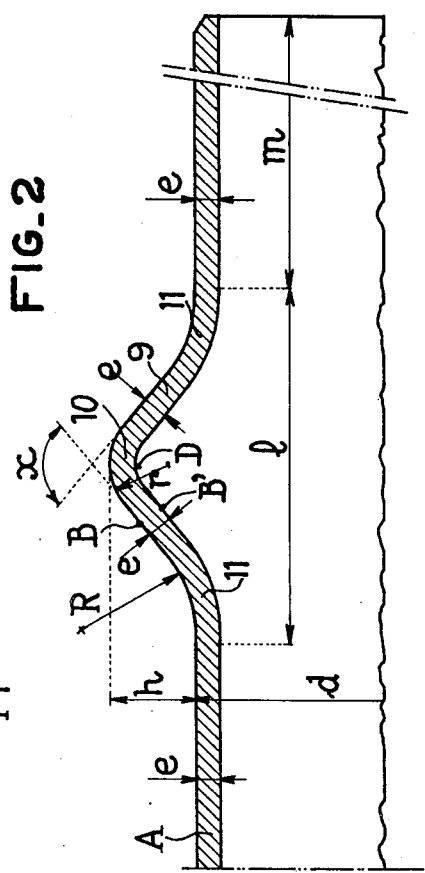
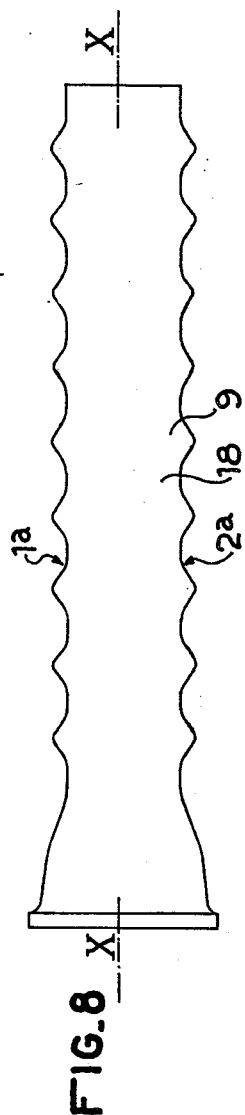

SPHEROIDAL GRAPHITE CAST IRON PIPE AND THE PROCESS FOR PRODUCING SAME

DESCRIPTION

The present invention relates to cast iron pipes and in particular to ductile or spheroidal graphite cast iron pipes or the like produced by centrifugal casting.

It is known that pipes and tubular elements of steel, aluminium or plastics material, which are materials reputed to be deformable and forgeable, are sometimes provided with circular corrugations or projections for certain applications, for example for stiffening when they have a large diameter and have a wall which is thin relative to the diameter, so as to resist crushing when they are buried in the ground, or for the purpose of producing tubular assemblies in which a projection or corrugation must perform a function, for example support a locking member of the assembly or provide an anchoring member for a sealing element.

These circular projections are produced by the deformation or forging of these materials (which possess properties of elongation which facilitate such an operation) and are thus an integral part of the wall of the tubular object.

Up to the present time, it has not been possible to produce satisfactory corrugated projections on the wall of ductile cast iron pipes or tubular elements since, when it was attempted to employ the known methods for tubes of steel, aluminium or plastics material, cracks and fractures occurred as soon as the projection became more pronounced. In particular, it was not possible to produce on ductile cast iron pipes projections in the form of circular more or less flattened pleats or puckers having a triangular or trapezoidal section the corners of which have relatively sharp edges, or having an arcuate or festooned or half-moon section which have a slight projection but are connected to the cylindrical wall by a sharp edge, which sections are often met with in the form of circular pleats or grooves in the aforementioned tubes of materials having a high degree of elongation.

An object of the invention is to provide a ductile cast iron pipe or the like which has circular projections which sufficiently project for the purposes defined hereinbefore notwithstanding the substantially lower degree of elongation of this material relative to the aforementioned materials.

According to the invention, there is provided a spheroidal graphite cast iron pipe which has on its cylindrical wall at least one corrugated circular projection which has the same thickness as the wall, said circular projection having a meridian section in the shape of a isosceles triangle having an obtuse apex angle and a radiused apex, said triangle being connected to the cylindrical wall by wide portions of large radius which exceeds the radius of the apex and is a plurality of times larger than the thickness of said wall.

The Applicant has found that it was surprisingly possible to produce, with such a section, circular projections which greatly project from the cylindrical wall without the least crack or fracture, while the graphite remains in the spheroidal form in the deformed part. In a particularly suitable section obtained, the projection has a height which is a plurality of times greater than its thickness and is between 1/12th and 1/7th of the outside diameter of said cylindrical wall and has a length which is distinctly greater than this height.

Another object of the invention is to provide a process for producing such a pipe. In this process, subsequent to the centrifugal casting and cooling of the cast pipe, and subsequent to its complete solification, a circular zone of the pipe in which the circular corrugated projection must be formed is locally heated to the softening temperature of the ductile iron and then the pipe is compressed axially, the axial thrust being stopped when the circular pleat obtained in the heated zone reaches the section defined hereinbefore, after which the previously heated and pleated annular zone is allowed to cool.

Further features and advantages of the invention will be apparent from the ensuing description. In the accompanying drawings which are given solely by way of example:

FIG. 1 is an elevational and axial sectional view to a reduced scale of a ductile cast iron pipe according to the invention, this view also illustrating the process for forging this pipe;

FIG. 2 is a partial axial sectional view to an enlarged scale of the end part of the pipe of FIG. 1;

FIG. 7 is a diagrammatic partial axial sectional view of a fluidtight locked assembly between two pipes, one of which comprises a projection according to the invention;

FIG. 8 is a diagrammatic elevational view, to the same scale as FIG. 1, of another ductile cast iron pipe according to the invention.

Figure 3:
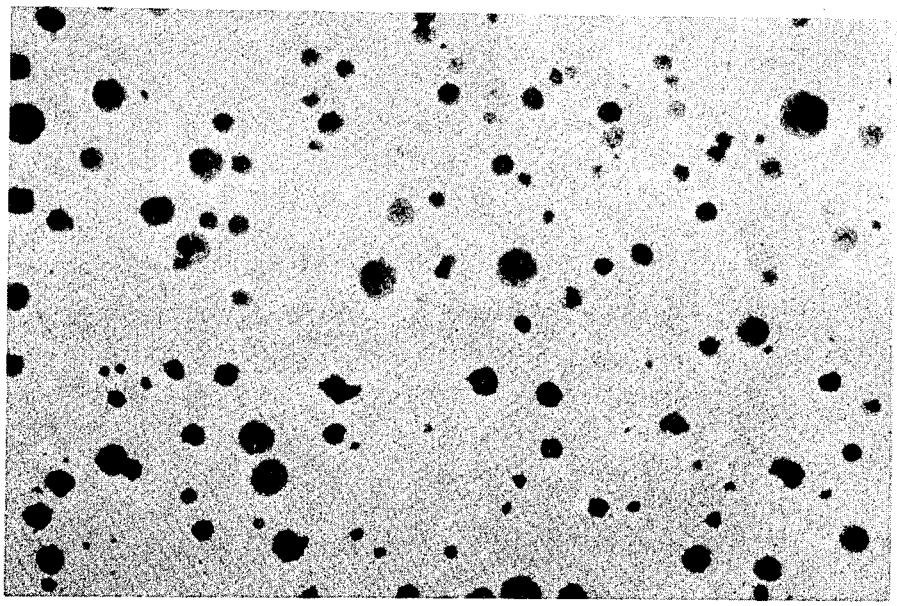
FIG. 3 is a micrograph, magnified 500 times, of the ductile cast iron pipe in a non-deformed part of the cylindrical wall of the pipe.

The pipe 1 shown in FIG. 1 is a spheroidal graphite cast iron pipe having an axis X—X produced by centrifugal casting. It comprises a cylindrical tubular body portion 2 of great length which terminates at one end in a cylindrical male end 3 and is converted at the other end into a bell or socket 4. The socket 4 comprises internally, starting at its entrance, a chamber 5 having a frustoconical wall 6 followed by a radial flange 7. The latter is adapted to receive the male end 3 of another identical pipe so as to form a sealed joint. Externally, the socket 4 has adjacent its entrance a moulded circular projection 8. The shape of the socket 4 depends on the chosen type of joint; an example thereof will be given hereinafter. The elongation of the pipe 1 after fracture, measured on a testpiece having a length equal to five times the diameter, is 12%.

According to the invention, the pipe 1 is provided with a single outer circular projection 9 on the wall of the body portion 2 in the vicinity of the male end 3. This projection 9, which is produced by a hot forging process described hereinafter, is devoid of cracks and tensile stress; its metallurgical structure and its thickness are the same as those of the rest of the body portion 2. The projection 9, which is of revolution about the axis X—X, has the following shape:

The circular projection 9 (FIG. 2) has a meridian section in the shape of an isosceles triangle having a radiused apex 10 and an obtuse apex angle x; its height h is a plurality of times greater than the thickness e of the pipe and of the order of 1/7th to 1/12th of the outside diameter d of the body portion 2. For example, h=d/10. The base of the isosceles triangle formed by the projection 9 has a length 1 distinctly greater than its height h, although the length 1 is difficult to measure with precision owing to the lack of distinctness of the two radiused transition portions 11 between the projection 9 and the body portion 2. Indeed, the projection 9 is connected to the cylindrical wall by radiused portions 11 whose minimum radius of curvature R is a plurality of times greater than the thickness e, and in any case substantially greater than the height h of the projection 9, whereas the outside radius of curvature r of the apex 10 is smaller and of the order of 2 to 5 times the thickness e. The thickness e of the projection 9 is the same as that of the body portion 2. Consequently, there is no thinning down. The projection 9 has a meridian section in the shape of a wave and may consequently be considered as a "corrugated" projection.

By way of example, for an outside diameter d of 170 mm, and a thickness e of the order of 6 mm, the height h may be of the order of 15 mm (h/d ≃11), the length 1 of the order of 60 to 90 mm, depending on the poorly defined measuring limits, and the angle x of the order of 100°. In another example, for an outside diameter d equal to 634 mm and a thickness e of the order of 12 mm, the height h is of the order of 30 mm, the length 1 of the order of 170 mm and the angle x of the order of 115°. It will be observed that the ratio h/d is then equal to roughly 1/21, i.e. is not within the limits indicated hereinbefore.

The projection 9 is located at a distance m from the end edge of the male end 3 which is much greater than the length 1, but if this length m is considered relative to the overall length of the pipe 1, this distance m is such that the projection 9 is in the vicinity of the end of the male end 3.

The projection 9 is produced by a forming process which will now be described with reference to FIG. 1.

With the pipe 1 in the cold state, it is placed on supports (not shown) between the plates P1 and P2 of a press and extends through a heating sleeve M whose inside diameter is distinctly greater than the outside diameter of the pipe and whose length is slightly greater than the length 1 of the projection 9 to be produced. The plate P1 is fixed and the plate P2 is axially movable in the direction of arrow f from the the position indicated in dot-dash lines in FIG. 1.

The sleeve M is heated, for example by an inductor supplied with current by electric cables C. By way of a modification, it may also be provided with an annular burner or a plurality of burners circularly spaced apart. The essential is that the sleeve M be capable of heating the pipe 1 until it softens in a well-localised zone corresponding to the projection 9 while leaving the neighbouring zones of the body portion 2 cold without heating them.

When the desired temperature has been reached, the movable press plate P2 is moved toward the fixed plate P1 so as to exert an axial thrust in the direction along the axis X—X. From the position initially illustrated in dot-dash lines, the plate P2 reaches the position shown in full lines and produces, by an upsetting, a regular circular pleat or pucker in the wall of the pipe 1. This pleat has a meridian section in the shape of an isosceles triangle and is of course accompanied by a shortening of the pipe 1 relative to the length it had when leaving the centrifugal casting machine (not shown). The displacement of the plate P2 is stopped when the projection 9 has a sufficient but not excessive amplitude h and an apex 10 has been obtained which is sufficiently radiused so that its angle x remains obtuse. The section described hereinbefore avoids any cracking by bending. Thereafter, the zone which has just been formed is allowed to cool down progressively, for example merely by stopping the heating, so as to conserve for the projection 9 the same iron structure as in the neighbouring parts of the body portion 2 and male end 3.

The foregoing process conserves practically intact the spheroidal graphite structure of the ductile cast iron of the centrifugally cast pipe; this spheroidal structure of the graphite is illustrated in the micrograph of FIG. 3, which concerns a non-deformed region of the cylindrical wall 2 (point A of FIG. 2).

Figure 4:
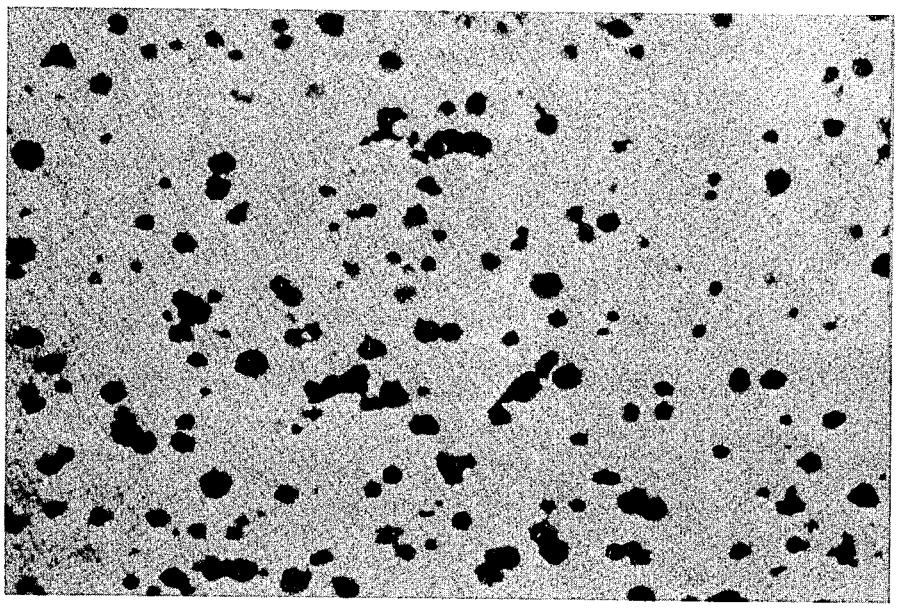
FIG. 4 is a similar micrograph, magnified 500 times, of the iron in a region near the outer edge of the projection or deformed portion.
Figure 5:
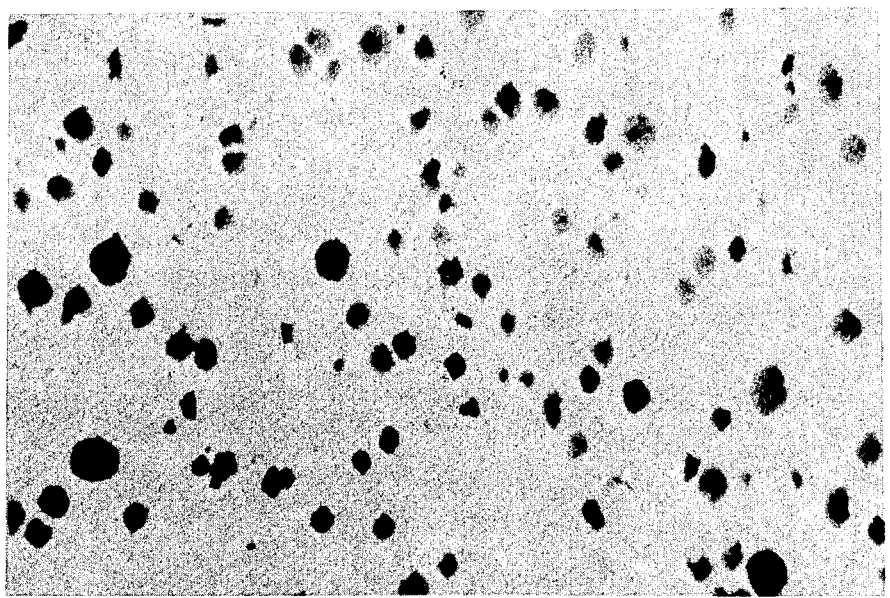
FIG. 5 is a micrograph, also magnified 500 times, of the cast iron in a region near the inner edge of the deformed portion.

FIGS. 4 and 5 illustrate at the same magnification the structures of the deformed portion or projection 9; as concerns a region near the outer edge of the projection in the body part of the latter (point B of FIG. 2), it is found that the major part of the free graphite has conserved the shape of spheroidal nodules.

FIG. 5 shows the structure of a region near the inner edge of the body part of the projection (point B' of FIG. 2) where the free graphite has also conserved the shape of spheroidal nodules for the major part of the nodules. At the very most there is found a slight elongation of the nodules in the form of ellipsoids whose major axis is perpendicular to the direction of the compression stress.

Figure 6:
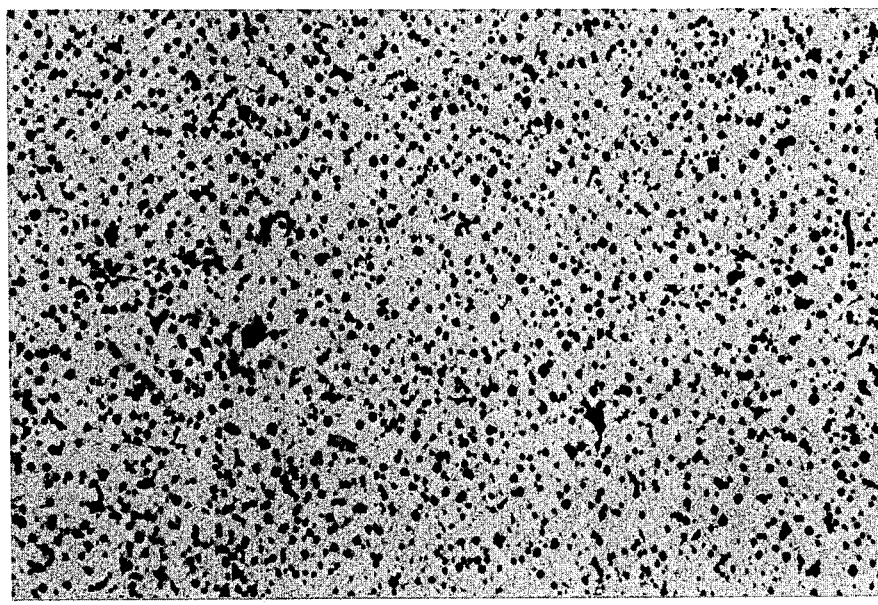
FIG. 6 is a micrograph, magnified 100 times, of the cast iron on the inner edge of the apex of the wave obtained.

There can also be recognised in FIG. 6 the spheroidal graphite structure at the apex of the projection 9 near the inner edge (point D of FIG. 2).

Further, no tearing was found on the projection 9.

In order to illustrate an application of this projection 9, FIG. 7 shows a sectional view of a locked joint between the male end 3 of a pipe 1 and a socket 4 of another pipe 1. This assembly is of the type known under the registered trademark EXPRESS and is described in French Pat. No. 1,403,830. Disposed in the chamber 5 of the socket 4 is an annular sealing element 12 of rubber or other elastic material whose outer shape corresponds to that of the chamber and whose inner shape is cylindrical.

The male end 3 of a pipe 1 is freely inserted in the chamber 5 through the sealing element 12 and the flange 7 until the projection 9 is located very close to the entrance of the socket 4. Bearing against the projection 9 is a counter-flange 13 having an annular bearing skirt portion 14. The counter-flange 13 is completed by a frustoconical compression ring 15 which bears against an inner circular shoulder 16 of the counter-flange 13 which faces the end edge of the socket 4. The counter-flange 13 is axially urged toward the socket 4 by bolts 17 which are arranged around the periphery of the counter-flange and bear against the outer projection 8 of the socket 4. The circular projection 9 is disposed in the triangular space defined between the skirt portion 14 and the ring 15.

Thus the sealing element 12 is clamped or compressed by the ring 15 against the male end 3 of the first pipe 1, against the frustoconical wall 6 of its chamber 5 and against the inner flange 7, whereas the sealed assembly thus formed between the two pipes is axially locked by the combination of the counter-flange 13 and the projection 9.

The pipe $1^a$ shown in FIG. 8 differs from the pipe 1 of FIG. 1 in that a number of projections or corrugations 9 are provided which are evenly spaced apart along the whole of its body portion $2^a$ with non-corrugated intervals 18 formed between the projections 9. This pipe $1^a$ is produced by forging the projections 9 in succession by the same process as for the single projection of FIG. 1.

There is of course a substantial shortening of the length of the pipe $1^a$ relative to the initial length of the pipe as it issued from the centrifugal casting machine.

The pipe $1^9$ possesses the advantage of having an increased stiffness notwithstanding the fact that its wall is thin. Although such a pipe $1^a$ has been illustrated with the same diameter as the pipe 1, which is a small or medium diameter, this advantage is particularly appreciable in respect of pipes of large diameter, for example at least equal to 700 mm and which may be as much as 2 m at the present time. Moreover, note that the presence of a single circular projection 9 in the vicinity of the male end 3, as in the pipe 1 of FIGS. 1 and 2, is also advantageous since it stiffens the male end 3 and precludes the ovalisation thereof.

It must be understood that the scope of the invention is in no way intended to be limited to pipes having a socket. It is also applicable to tubular elbow couplings, T and Y couplings or couplings in the form of a simple sleeve, whether these elements have, or do not have, a socket.

Having now described my invention what I claim as new and desire to secure by Letters Patent is:

1. A centrifugally-cast iron pipe comprising in combination and in one piece a cylindrical wall having a first end portion defining a bell and a second end portion opposed to said first end portion for insertion in a bell of an identical pipe, at least one outer corrugated circular projection which is provided on said wall in said second end portion by a deformation of said wall and has the same thickness as said wall, said pipe being entirely of spheroidal graphite cast iron, said circular projection having a height which is a plurality of times greater than the thickness of the projection and between 1/12th and 1/7th of the outside diameter of said cylindrical wall and has a length distinctly greater than said height and having a meridian section in the shape of an isosceles triangle having an obtuse apex angle and a radiused apex, and large-radius portions which connect said triangle to the cylindrical wall and have a radius which exceeds the radius of the apex and is a plurality of times greater than the thickness of said wall.

2. A pipe as claimed in claim 1, wherein the apex angle of the projection is substantially 100°.

3. A pipe as claimed in claim 1, wherein the radius of curvature of the apex is between 2 and 5 times the thickness of said wall.

4. A pipe as claimed in any one of the claims 1, 2 or 3, wherein said circular projection is the sole circular projection on said pipe.

5. A pipe as claimed in any one of the claims 1, 2 or 3, comprising a plurality of said circular projection arranged along substantially the entire length of said cylindrical wall.

6. A pipe a claimed in claim 1 or 3, wherein the apex angle of the projection is between 100° and 115°.

7. A process for producing a centrifugally-cast iron pipe comprising in one piece a cylindrical wall having a first end portion defining a bell and a second end portion opposed to said first end portion for insertion in a bell of an identical pipe, at least one outer corrugated circular projection which is provided on said wall in said second end portion by a deformation of said wall and has the same thickness as said wall, said pipe being entirely of spheroidal graphite cast iron, said circular projection having a height which is a plurality of times greater than the thickness of the projection and between 1/12th and 1/7th of the outside diameter of said cylindrical wall and has a length distinctly greater than said height and having a meridian section in the shape of an isosceles triangle having an obtuse apex angle and a radiused apex, and large-radius portions which connect said triangle to the cylindrical wall and have a radius which exceeds the radius of the apex and is a plurality of times greater than the thickness of said wall, said process comprising in combination:

centrifugally casting the whole of the pipe complete with said bell end portion from spheroidal graphite cast iron and thereafter cooling the pipe, and, after its complete solidification, locally heating a circular zone of the pipe, in which zone the corrugated circular projection must be formed, until the softening temperature of the cast iron is reached, then axially compressing the pipe by exerting an axial thrust on the pipe, said axial thrust being stopped when a circular pleat produced in the heated zone has reached a sectional shape and height corresponding to the sectional shape and height of the desired corrugated circular projection, and then allowing the previously heated and pleated annular zone to cool.

* * * * *